(12) United States Patent
Kosuge et al.

(10) Patent No.: US 6,174,512 B1
(45) Date of Patent: Jan. 16, 2001

(54) SILICA MESOPOROUS BODY AND PROCESS FOR PREPARING SAME

(75) Inventors: Katsunori Kosuge, Tsukuba (JP); Puyam Sobhindro Singh, Canberra (AU)

(73) Assignee: Director-General of Agency of Industrial Science and Technology (JP)

( * ) Notice: Under 35 U.S.C. 154(b), the term of this patent shall be extended for 0 days.

(21) Appl. No.: 09/169,953

(22) Filed: Oct. 13, 1998

(30) Foreign Application Priority Data

Oct. 13, 1997 (JP) .................................................. 9-278330

(51) Int. Cl.[7] .......................... C01B 33/12; C01B 33/20; C01B 33/26
(52) U.S. Cl. .......................... 423/705; 423/716; 423/326; 423/328.1; 423/328.2; 423/335; 501/80; 501/81
(58) Field of Search .................................. 423/705, 716, 423/326, 328.1, 328.2, 335; 501/80, 81; 502/232, 242, 244, 259, 260, 263

(56) References Cited
U.S. PATENT DOCUMENTS 5,112,589 * 5/1992 Johnson et al. .
5,128,114 * 7/1992 Schwartz ............................... 423/335
5,712,402 * 1/1998 Pinnavaia et al. ................... 552/309

OTHER PUBLICATIONS

Schacht et al. "Oil–Water Interface Templating of Mesoporous Macroscale Structures," Science, vol. 273, pp. 768–771, Aug. 1996.*
Tanev et al., "Titanium–Containing Mesoporous Molecular Sieves for Catalytic Oxidation of Aromatic Compounds," Nature, vol. 368, pp. 321–323, Mar. 1994.*
Huo et al., "Preparation of Hard Mesoporous Silica Spheres," Chem. Mater., vol. 9, pp. 14–17, 1997.*

* cited by examiner

Primary Examiner—Mark L. Bell
Assistant Examiner—David Sample
(74) Attorney, Agent, or Firm—Lorusso & Loud (57) ABSTRACT

A method of producing a mesoporous silica material, including reacting, with stirring, a liquid mixture containing a tetraalkyl orthosilicate, a linear alkylamine, an inorganic acid and water, and drying and thermally treating the thus obtained solid product, wherein the amounts of the inorganic acid, alkylamine and water are 0.05–0.6 mol, 0.2–1.0 mol and 10–100 mol, respectively, per mol of the tetraalkyl orthosilicate. Mesoporous silica hard spheres having an average pore diameter of 1.5–4 nm and a volume average diameter of 40–80 μm. The mesoporous silica hard spheres may contain metal components other than silica.

19 Claims, 3 Drawing Sheets

SILICA MESOPOROUS BODY AND PROCESS FOR PREPARING SAME

BACKGROUND OF THE INVENTION

This invention relates to a mesoporous silica material and to a method of producing same. More specifically, the present invention is directed to a mesoporous silica material (mesoporous silica spheres) having both regularly distributed uniform pores and a regular morphology.

Since 1992 in which MCM-41 was discovered by Mobil Corporation, a great number of studies pertaining to mesoporous materials have been reported. There are recent reports suggesting a possibility of the formation of regularly distributed mesopores and, at the same time, the control of a structure of a micron or millimeter scale on the basis of the above synthesis method. For example, (1) by controlling a mixing ratio of a surfactant to water and a rate of condensation of silica under highly alkaline conditions, a mesoporous silica material which is in a hollow fibrous state having a diameter of 3 μm and a length of 20 μm and which has a shell portion wherein cylindrical mesopores are arranged in a honeycomb-like state is produced. (2) Also produced are sheet-like or hollow spherical porous silica particles having a macro-morphology of a micron order, depending upon a speed of stirring a hydrochloric acid-containing, aqueous CTAB (cetyltrimethylammonium bromide) solution at the time of dropwise addition of mesitylene-containing tetraethyl orthosilicate (TEOS) thereto. (3) Porous silica hard spheres having a particle size ranging from 0.1 to 2 mm are produced by adding tetrabutyl orthosilicate (TBOS) to an aqueous solution containing CTAB and NaOH and by stirring the mixture.

The above mesoporous silica materials have drawbacks with respect to the preparation methods thereof, because the reaction steps are complicated and because a long reaction time is required. Additionally, in (1), there is a defect in the pore structure thereof, because a film-like substance having mesopores changes into a cylindrical form. Moreover, it is not possible to suppress crystallization of fine particles. In (2), it is difficult to efficiently obtain uniform spherical particles, because the macro-morphology of the mesoporous silica materials is sensitive to the stirring speed. Thus, addition of mesitylene is required. In (3), there is a problem that TEOS is not able to be used.

SUMMARY OF THE INVENTION

It is an object of the present invention to provide mesoporous silica materials which have overcome the problems of the conventional techniques and a method of producing same. Another object of the present invention is to provide mesoporous silica hard spheres having spherical macro-morphology having a micron order size and, at the same time, regularly distributed pores. It is a further object of the present invention to provide a method of producing mesoporous silica materials, which can control not only the pore structure but also the regularity of the macro-morphology. It is yet a further object of the present invention to provide a method which can produce mesoporous silica materials at room temperature within a short period of time.

In accordance with the present invention there is provided a method of producing a mesoporous silica material, comprising reacting, with stirring, a liquid mixture containing a tetraalkyl orthosilicate, a linear alkylamine, an inorganic acid and water, and drying and thermally treating the thus obtained solid product, wherein said inorganic acid, said alkylamine and said water are present in amounts of 0.05–0.6 mol, 0.2–1.0 mol and 10–100 mol, respectively, per mol of said tetraalkyl orthosilicate.

The present invention also provides mesoporous silica hard spheres having an average pore diameter of 1.5–4 nm and a volume average diameter of 40–80 μm. The mesoporous silica hard spheres may contain metal components other than silica.

The mesoporous silica materials according to the present invention can be suitably used as shape-selective catalysts, as adsorbing, separating and storing agents for useful gas or ions, as separating and adsorbing agents for harmful gases or ions and as catalysts decomposition of harmful gases or ions.

DETAILED DESCRIPTION OF THE PREFERRED EMBODIMENT OF THE INVENTION

A method of producing a mesoporous silica material according to the present invention (hereinafter also referred to as "porous material") utilizes order formability of an alkylamine, so that a mesoporous silica material having both regularly distributed micropores and a regular macro-morphology is produced.

In one embodiment of the present invention, a tetraalkyl orthosilicate, an inorganic acid and water are mixed with each other to form an emulsion, which is then reacted with a linear alkylamine to form hollow or plate-like mesoporous silica materials.

In a second embodiment, a tetraalkyl orthosilicate and a linear alkylamine are mixed with each other to form a mixture, which is then reacted with an aqueous inorganic acid solution to form a mesoporous silica hard material.

A synthesis mechanism in the first embodiment is probably as follows. Dissolved species of silica, which have been formed from an alkoxide, and an alkylamine form an emulsion of a micron order size with an acidic solution phase serving as a boundary phase. When the emulsion is stable, the dissolved silica species can interact, based on an electrostatic force, with the alkylamine at the boundary phase, so that mesostructured phase regularly distributed along the boundary phase are formed. When such a solid product is centrifuged, dried and then heat-treated to remove the alkylamine, there are obtained hollow mesoporous silica spheres having a diameter of 0.2–5 μm and spherical shells in which mesopores are present. In this case, the size of the mesopores can be controlled by changing the carbon number of the alkylamine and the kind, concentration and amount of the acidic solution.

On the other hand, when a stable emulsion is not formed due to rapid interaction between the alkylamine and the dissolved silica species in the boundary, acidic solution phase, flake-like crystallites having mesopores aggregate to form a particle. Macroscopically, a number of such particles aggregate to form a plate-like particle. Namely, when a solid product is centrifuged and dried to remove the alkylamine, there are obtained a plate-like mesoporous silica material which is an aggregate of flake-like crystallites each having a size of 0.2–5 μm and each containing regularly distributed mesopores. For the formation of a mesoporous silica material of this type, decylamine or dodecylamine is suitably used as the alkylamine. The size of the mesopores can be controlled by the carbon number of the alkylamine and the kind, concentration and amount of the acidic solution.

In the second embodiment, metal-containing mesoporous silica hard spheres can be obtained by allowing a metal component other than silicon to be present in the reaction system. Illustrative of suitable metals are Ti, Zr, Al, Cu, Co and Ni. As the metal component, not only a metal alkoxide but also, in the case of Cu, Co, Ni, etc., a salt capable of forming a complex with an alkylamine may be used.

The mesoporous silica materials produced by the above method have periodically arranged pores, permit the size of the pores to be easily controlled, and have a spherical or plate-like macro-morphology. Especially, the mesoporous silica hard spheres (which can contain a metal) are novel substances. The porous materials of the present invention are characterized in that they can be produced at room temperature and an ambient pressure and, yet, within a short period of time and in that they are thermally stable.

Figure 1:
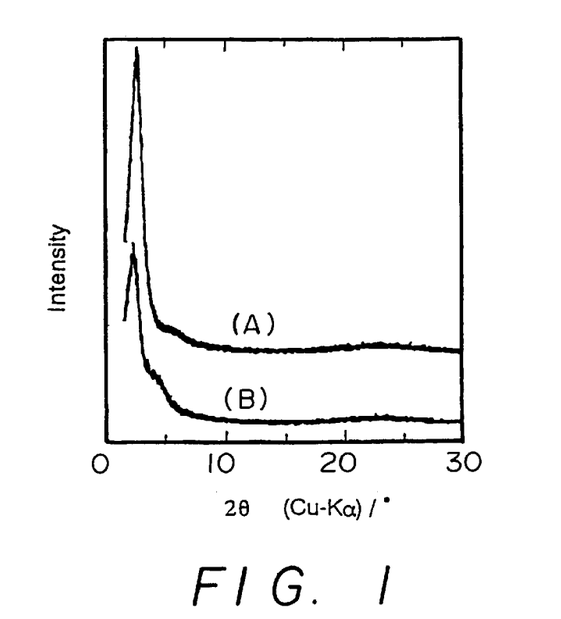
FIG. 1 is a powder X-ray diffraction pattern of mesoporous silica materials shown in Example 10 (Pattern A) and Example 21 (Pattern B)
Figure 2:
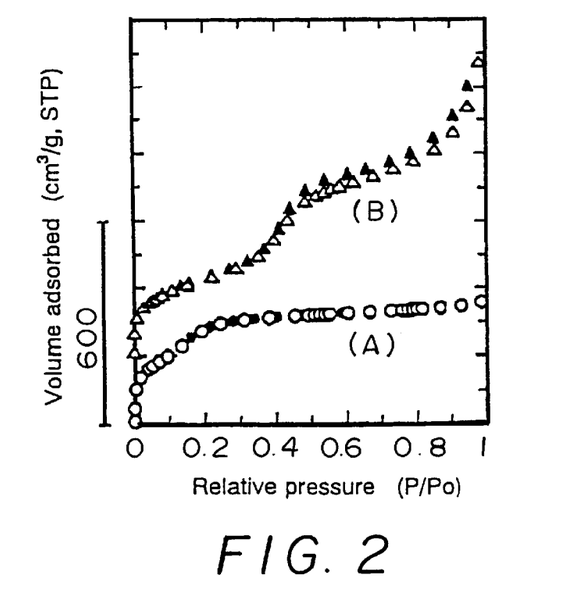
FIG. 2 is nitrogen absorption isotherms of mesoporous silica materials shown in Example 10 (Curve A) and Example 21 (Curve B)

Patterns (A) and (B) in FIG. 1 are X-ray diffraction patterns of mesoporous hollow spheres and mesoporous plate-like materials, respectively. The presence of basal reflection indicates that the arrangement of the pores is regular. FIG. 2 shows nitrogen absorption isotherms, wherein the curves (A) and (B) are for the mesoporous hollow spheres and mesoporous plate-like materials, respectively. The pattern is of a IV-type and a significant step is observed in (B) at a relative pressure of about 0.4. The t-curves thereof have a shape peculiar to mesopores. From a pore diameter distribution curve obtained according to the Horvath-Kawazoe method reveals the average effective pore diameters of the mesoporous hollow spheres and mesoporous plate-like materials are 2.2 nm and 4.0 nm, respectively, and have relatively a sharp distribution.

Figure 3A:
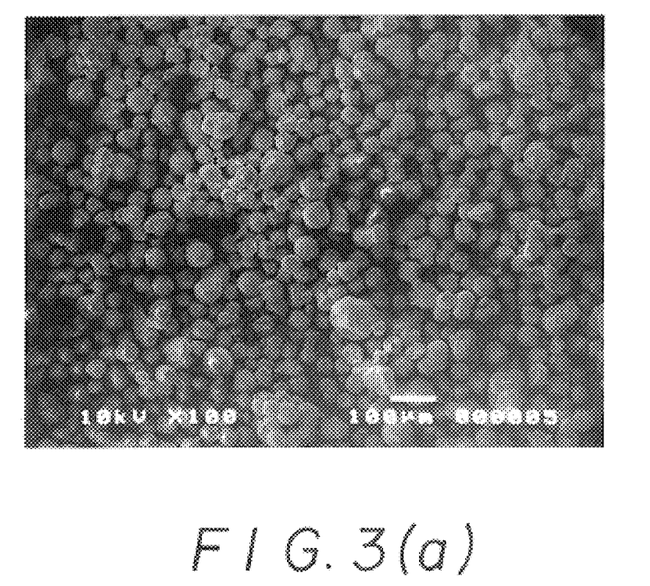
FIG. 3(a) is a scanning electron microphotograph of a mesoporous silica material shown in Example 32.
Figure 3B:
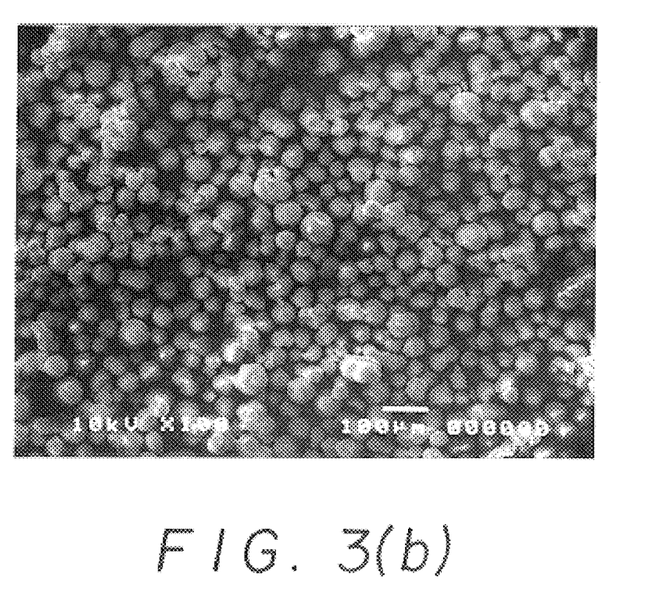
FIG. 3(b) is a scanning electron microphotograph of a Ti-containing mesoporous silica material shown in Example 33.
Figure 4:
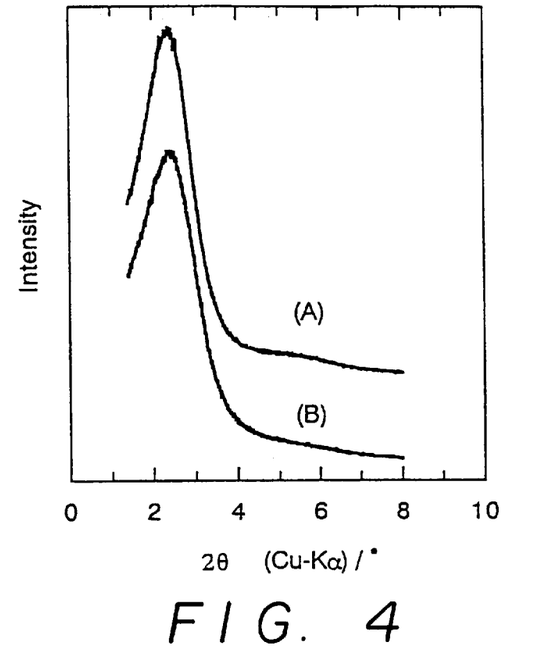
FIG. 4 is a powder X-ray diffraction pattern of a mesoporous silica material shown in Example 32 (Pattern A) and a Ti-containing mesoporous silica material shown in Example 33 (Pattern B)
Figure 5:
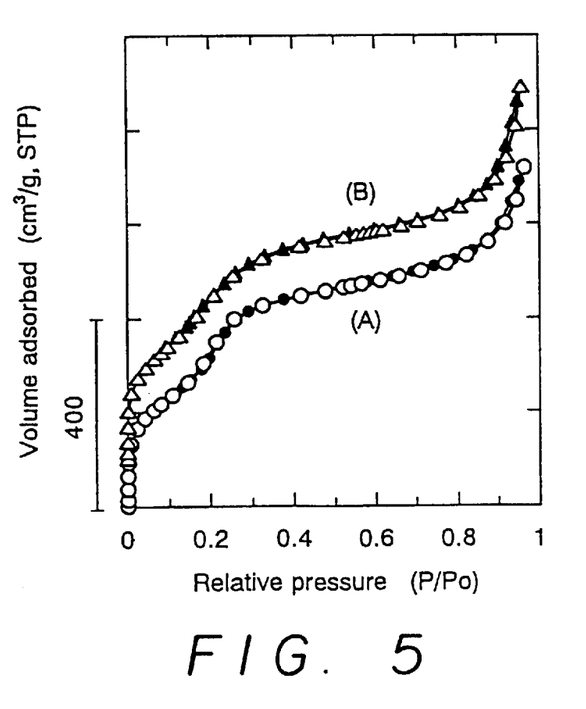
FIG. 5 is nitrogen absorption isotherms of a mesoporous silica material shown in Example 32 (Curve A) and a Ti-containing mesoporous silica material shown in Example 33 (Curve B).

FIGS. 3(a) and 3(b) are scanning electron microphotographs of mesoporous silica hard spheres and metal-containing mesoporous silica hard spheres, respectively. Patterns (A) and (B) in FIG. 4 are X-ray diffraction patterns of the mesoporous silica hard spheres and metal-containing mesoporous silica hard spheres shown in FIGS. 3(a) and 3(b), respectively. The presence of basal reflection indicates that the arrangement of the pores are regular. FIG. 5 shows nitrogen absorption isotherms, wherein the curves (A) and (B) are for the mesoporous silica hard spheres and metal-containing mesoporous silica hard spheres shown in FIGS. 3(a) and 3(b), respectively. The pattern is of a IV-type. The t-curves thereof have a shape peculiar to mesopores. From a pore diameter distribution curve obtained according to the Horvath-Kawazoe method reveals the average effective pore diameters of the mesoporous silica hard spheres and metal-containing mesoporous silica hard spheres are 2.3 nm and 2.2 nm, respectively, and have relatively a sharp distribution.

Any of the porous materials has periodically distributed pores and has a micro structure in which pores of typically 1.5–4 nm, preferably 1.7–3.5 nm, are regularly arranged with a hexagonal matrix.

The mesoporous silica hard spheres (which can contain a metal component) have an average pore diameter of 1.5–4 nm and a volume average particle diameter of 40–80 μm. The particle diameter thereof preferably ranges from 10–130 μm. When heat-treated at 600° C. for 1 hour in air, the mesoporous silica hard spheres show a relative surface area of 800 m$^2$/g. When the mesoporous silica hard spheres contain a metal component, the metal thereof may be present in the state where the metal is substituted for silicon atoms of the silicate framework or where the metal is dispersed in the porous material in the form of an oxide.

The term "periodically distributed pores" described above is intended to refer to pores having a hexagonal matrix wall structure that has such ordered $SiO_4$ tetrahedron units that can give (001) reflection in an XRD pattern thereof.

The average pore diameter, surface area and pore volume in the present specification are as measured by a nitrogen absorption method at −196° C. using BELSORP 28 (manufactured by Nippon Bel Inc.) as a measurement device.

The interplanar spacing $d_{001}$ is measured by a powder X-ray diffraction method at room temperature with a Rigaku Rotaflex diffractometer (RU300 manufactured by Rigaku Inc.).

The mesoporous silica materials may be synthesized in the following manner. In this case, as a starting material Si-alkoxide, there may be used a lower alkoxy-group-containing silicate having 1–4 carbon atoms, such as tetramethyl orthsilicate, tetraethyl orthsilicate, tetraisopropyl orthsilicate or tetra-n-butyl orthsilicate. The use of tetraethyl orthsilicate (hereinafter referred to as TEOS) is preferably used. As a linear alkylamine, those having at least 6 carbon atoms, preferably 8–12 carbon atoms are used. As an inorganic acid, hydrochloric acid, sulfuric acid or nitric acid may be used.

Examples of the synthesis of mesoporous silica materials using TEOS and HCl will be concretely described below.

(a) In the case of mesoporous silica hollow spheres having mesopores, TEOS is first mixed with an aqueous HCl solution, which is then stirred at a suitable stirring speed (e.g. 500–1,000 rpm) for 1–10 minutes to form an emulsion. While continuing the stirring, the emulsion is reacted with an alkylamine for 15–120 minutes. Octylamine is preferably used as the alkylamine. Mixing molar ratio of the starting materials, TEOS:HCl:alkylamine:water, is 1:(0.25–0.5):(0.6–0.7):(20–50).

(b) A procedure similar to that in (a) above may be adopted for the production of mesoporous silica plate-like material which is an aggregate of flake-like crystallites having mesopores. Decylamine or dodecylamine is preferably used as the amine. Mixing molar ratio of the starting materials, TEOS:HCl:alkylamine:water, is 1:(0.2–0.4):(0.45–0.55):(20–30).

(c) In the case of mesoporous silica hard spheres having mesopores, TEOS is first mixed with a linear alkylamine to obtain a mixture. In this case, the mixture is prepared with stirring at a suitable stirring speed (e.g.

100–1,500 rpm) for preferably 1–10 minutes. While continuing the stirring, the mixture is reacted with an aqueous HCl solution. The reaction time may be 15–120 minutes but can be 1–2 days. Octylamine is preferably used as the alkylamine. Mixing molar ratio of the starting materials, TEOS:HCl:alkylamine:water, is 1:(0.05–0.19):(0.2–1.0):(30–95), more preferably 1:(0.09–0.17):(0.4–0.75):(40–80).

(d) A procedure similar to that in (c) above may be adopted for the production of metal-containing, mesoporous silica hard spheres (hereinafter also referred to as silica-base porous material). Octylamine is preferably used as the alkylamine. Mixing molar ratio of the starting materials (other than a metal), TEOS:HCl:alkylamine:water, is 1:(0.05–0.19):(0.2–1.0):(30–95), more preferably 1:(0.09–0.17):(0.4–0.75):(40–80). The production of metal-containing, mesoporous silica hard spheres will be described in more detail below.

When one kind of a metal component is used in addition to Si base metal and when Ti is used, a Ti-alkoxide is used as a Ti raw material. Examples of such Ti-alkoxides include tetraethyl orthotitanate, tetraisopropyl orthotitanate and tetra-n-butyl orthotitanate. Tetraethyl orthotitanate (hereinafter referred to as TEOT) is preferably used. To 1 mol of TEOS, 0.001–0.1 mole, preferably 0.0025–0.06 mol, of TEOT is added, to which an alkylamine is further added. The mixture is then stirred at 300–1,000 rpm for 1–20 minutes. While continuing the stirring at that speed, the mixture is added with an acid solution and is then allowed to be reacted at room temperature for at least 15 minutes, preferably at least 1 hour.

In the case of Zr, a solution of zirconium tetra-n-butoxide solution (a 80 wt % solution dissolved in 1-butanol; hereinafter referred to as TBOZ) is preferably used. This is added in an amount of 0.001–0.06 mole, preferably 0.0025–0.04 mol to 1 mol of TEOS, to which an alkylamine is further added. The mixture is then stirred at 300–1,000 rpm for 1–20 minutes. While continuing the stirring at that speed, the mixture is added with an acid solution and is then allowed to be reacted at room temperature for at least 15 minutes, preferably at least 1 hour.

In the case of Al, aluminum tri-sec-n-butoxide is preferably used. This is added in an amount of 0.001–0.07 mole, preferably 0.0025–0.05 mol to 1 mol of TEOS, to which an alkylamine is further added. The mixture is then stirred at 300–1,000 rpm for 1–20 minutes. While continuing the stirring at that speed, the mixture is added with an acid solution and is then allowed to be reacted at room temperature for at least 15 minutes, preferably at least 1 hour.

In the case of Cu and Ni, not only alkoxides but also soluble metal salts, such as cupric chloride (dihydride) and nickel chloride hexahydride, may be used. Any metal salt may be used as long as it can form a amine complex and gives a transparent solution. The maximum mixing proportion is such that the salt is dissolved in an alkylamine at a saturated solubility thereof. The amine complex solution is mixed such that the amount of the alkylamine is 0.4–1.0 mole, preferably 0.55–0.75 mol, per 1 mol of TEOS. The mixture is stirred at 300–1,000 rpm for 1–20 minutes. While continuing the stirring at that speed, the mixture is added with an acid solution and is then allowed to be reacted at room temperature for at least 15 minutes, preferably at least 1 hour.

Silica-base porous hard spheres containing two or more kinds of metal components in addition to Si base metal may be produced in accordance with the above-described method. For example, in the case of Si, Ti and Zr, TEOT and TBOZ having any desired mixing ratio are added to TEOS such that the molar ratio of the total of TEOT and TBOZ to TEOS is 0.001–0.1, preferably 0.025–0.06. After being further added with an alkylamine, the mixture is stirred at 300–1,000 rpm for 1–20 minutes. While continuing the stirring at that speed, the mixture is added with an acid solution and is then allowed to be reacted at room temperature for at least 15 minutes, preferably at least 1 hour. In the case of Si, Ti and Al, TEOT and aluminum tri-sec-butoxide having any desired mixing ratio are added to TEOS such that the molar ratio of the total of TEOT and aluminum tri-sec-butoxide to TEOS is 0.001–0.07, preferably 0.025–0.05. After being further added with an alkylamine, the mixture is stirred at 300–1,000 rpm for 1–20 minutes. While continuing the stirring at that speed, the mixture is added with an acid solution and is then allowed to be reacted at room temperature for at least 15 minutes, preferably at least 1 hour. Namely, when two kinds of metal components are mixed with TEOS, it is preferred that a smaller mixing ratio of the two be selected. In this case, the mixing ratio of the two kinds of the metal components is arbitrary.

In the production of a silica-base porous material by mixing a metal salt of Cu, Ni, Co or the like metal capable of forming a complex with an alkylamine with the above alkoxide of Ti, Zr, Al or the like, it is advisable to previously prepare a transparent homogeneous amine complex solution. As described previously, the maximum mixing proportion of the metal salt is such that the salt is dissolved in an alkylamine at a saturated solubility thereof. The amine complex solution is mixed with the mixed alkoxide solution such that the amount of the alkylamine is 0.4–1.0 mole, preferably 0.55–0.75 mol, per 1 mol of TEOS. The mixture is then stirred at 300–1,000 rpm for 1–20 minutes. While continuing the stirring at that speed, the mixture is added with an acid solution and is then allowed to be reacted at room temperature for at least 15 minutes, preferably at least 1 hour.

After completion of the reaction, the solid product is centrifuged and then dried at a temperature from room temperature to 100° C., preferably 30–60° C., for at least 12 hours. The dried product is finally heat-treated at a temperature of at least 400° C., preferably 450–900° C., for at least 1 hour to remove organic compounds and to obtain a porous material.

EXAMPLE

The present invention will next be described in more detail by examples. However, the present invention is not limited by the examples. Mixing ratio is a molar ratio.

Example 1

A mixed solution of TEOS with an aqueous hydrochloric acid solution was stirred at 600 rpm for 5 minutes. While continuing the stirring, the mixed solution was then mixed with hexylamine and the mixture was reacted at room temperature for 60 minutes. The molar ratio of TEOS:HCl:hexylamine:water was 1:0.223:0.842:24.802). After the reaction, the solid product was centrifuged and then dried at room temperature for 1 day and then at 50° C. for another 1 day. Finally, the product was heated at 500° C. for 2 hours to remove organic compounds and to obtain a silica porous material. The porous material was in the form of spherical particles and had pore characteristics, such as specific surface area, as shown in Table 1.

TABLE 1

| Amine | Interplanar Distance $d_{001}$ (nm) | BET Specific Surface Area $S_{BET}$ (m$^2$/g) | Pore Diameter d (nm) | Pore Volume V (ml/g) |
| --- | --- | --- | --- | --- |
| Hexylamine | 3.0 | 1,050 | 0.9 | 0.38 |

Example 2

A mixed solution of TEOS with an aqueous hydrochloric acid solution was stirred at 600 rpm for 5 minutes. While continuing the stirring, the mixed solution was then mixed with octylamine and the mixture was reacted at room temperature for 60 minutes (TEOS:HCl:octylamine:water= 1:0.223:0.674:24.802). After the reaction, the solid product was centrifuged and then dried at room temperature for 1 day and then at 50° C. for another 1 day. Finally, the product was heated at 500° C. for 2 hours to remove organic compounds and to obtain a mesoporous silica material. The porous material was in the form of hollow spherical particles and had pore characteristics, such as specific surface area, as shown in Table 2.

TABLE 2

| Amine | Interplanar Distance $d_{001}$ (nm) | BET Specific Surface Area $S_{BET}$ (m$^2$/g) | Pore Diameter d (nm) | Pore Volume V (ml/g) |
| --- | --- | --- | --- | --- |
| Octylamine | 3.4 | 864 | 2.4 | 0.68 |

Example 3

A mixed solution of TEOS with an aqueous hydrochloric acid solution was stirred at 600 rpm for 5 minutes. While continuing the stirring, the mixed solution was then mixed with octylamine and the mixture was reacted at room temperature for 60 minutes (TEOS:HCl:octylamine:water= 1:0.281:0.674:24.802). After the reaction, the solid product was centrifuged and then dried at room temperature for 1 day and then at 50° C. for another 1 day. Finally, the product was heated at 500° C. for 2 hours to remove organic compounds and to obtain a mesoporous silica material. The porous material was in the form of hollow spherical particles and had pore characteristics, such as specific surface area, as shown in Table 3.

TABLE 3

| Amine | Interplanar Distance $d_{001}$ (nm) | BET Specific Surface Area $S_{BET}$ (m$^2$/g) | Pore Diameter d (nm) | Pore Volume V (ml/g) |
| --- | --- | --- | --- | --- |
| Octylamine | 3.2 | 954 | 2.1 | 0.66 |

Example 4

A mixed solution of TEOS with an aqueous hydrochloric acid solution was stirred at 600 rpm for 5 minutes. While continuing the stirring, the mixed solution was then mixed with octylamine and the mixture was reacted at room temperature for 60 minutes (TEOS:HCl:octylamine:water= 1:0.335:0.674:24.802). After the reaction, the solid product was centrifuged and then dried at room temperature for 1 day and then at 50° C. for another 1 day. Finally, the product was heated at 500° C for 2 hours to remove organic compounds and to obtain a mesoporous silica material. The porous material was in the form of hollow spherical particles and had pore characteristics, such as specific surface area, as shown in Table 4.

TABLE 4

| Amine | Interplanar Distance $d_{001}$ (nm) | BET Specific Surface Area $S_{BET}$ (m$^2$/g) | Pore Diameter d (nm) | Pore Volume V (ml/g) |
| --- | --- | --- | --- | --- |
| Octylamine | 3.1 | 919 | 2.0 | 0.58 |

Example 5

A mixed solution of TEOS with an aqueous hydrochloric acid solution was stirred at 600 rpm for 5 minutes. While continuing the stirring, the mixed solution was then mixed with octylamine and the mixture was reacted at room temperature for 60 minutes (TEOS:HCl:octylamine:water= 1:0.393:0.674:24.802). After the reaction, the solid product was centrifuged and then dried at room temperature for 1 day and then at 50° C. for another 1 day. Finally, the product was heated at 500° C. for 2 hours to remove organic compounds and to obtain a mesoporous silica material. The porous material was in the form of hollow spherical particles and had pore characteristics, such as specific surface area, as shown in Table 5.

TABLE 5

| Amine | Interplanar Distance $d_{001}$ (nm) | BET Specific Surface Area $S_{BET}$ (m$^2$/g) | Pore Diameter d (nm) | Pore Volume V (ml/g) |
| --- | --- | --- | --- | --- |
| Octylamine | 3.5 | 913 | 2.0 | 0.60 |

Example 6

A mixed solution of TEOS with an aqueous hydrochloric acid solution was stirred at 600 rpm for 5 minutes. While continuing the stirring, the mixed solution was then mixed with octylamine and the mixture was reacted at room temperature for 60 minutes (TEOS:HCl:octylamine:water= 1:0.447:0.674:24.802). After the reaction, the solid product was centrifuged and then dried at room temperature for 1 day and then at 50° C. for another 1 day. Finally, the product was heated at 500° C. for 2 hours to remove organic compounds and to obtain a mesoporous silica material. The porous material was in the form of hollow spherical particles and had pore characteristics, such as specific surface area, as shown Table 6.

TABLE 6

| Amine | Interplanar Distance $d_{001}$ (nm) | BET Specific Surface Area $S_{BET}$ (m$^2$/g) | Pore Diameter d (nm) | Pore Volume V (ml/g) |
| --- | --- | --- | --- | --- |
| Octylamine | 3.5 | 844 | 2.0 | 0.45 |

Example 7

A mixed solution of TEOS with an aqueous hydrochloric acid solution was stirred at 600 rpm for 5 minutes. While continuing the stirring, the mixed solution was then mixed with octylamine and the mixture was reacted at room temperature for 60 minutes (TEOS:HCl:octylamine:water= 1:0.279:0.674:31.002). After the reaction, the solid product was centrifuged and then dried at room temperature for 1 day and then at 50° C. for another 1 day. Finally, the product was heated at 500° C. for 2 hours to remove organic compounds and to obtain a mesoporous silica material. The porous material was in the form of hollow spherical particles and had pore characteristics, such as specific surface area, as shown in Table 7.

TABLE 7

| Amine | Interplanar Distance $d_{001}$ (nm) | BET Specific Surface Area $S_{BET}$ (m$^2$/g) | Pore Diameter d (nm) | Pore Volume V (ml/g) |
|---|---|---|---|---|
| Octylamine | 3.1 | 981 | 2.2 | 0.66 |

Example 8

A mixed solution of TEOS with an aqueous hydrochloric acid solution was stirred at 600 rpm for 5 minutes. While continuing the stirring, the mixed solution was then mixed with octylamine and the mixture was reacted at room temperature for 60 minutes (TEOS:HCl:octylamine:water= 1:0.335:0.674:37.202). After the reaction, the solid product was centrifuged and then dried at room temperature for 1 day and then at 50° C. for another 1 day. Finally, the product was heated at 500° C. for 2 hours to remove organic compounds and to obtain a mesoporous silica material. The porous material was in the form of hollow spherical particles and had pore characteristics, such as specific surface area, as shown in Table 8.

TABLE 8

| Amine | Interplanar Distance $d_{001}$ (nm) | BET Specific Surface Area $S_{BET}$ (m$^2$/g) | Pore Diameter d (nm) | Pore Volume V (ml/g) |
|---|---|---|---|---|
| Octylamine | 3.1 | 974 | 2.1 | 0.65 |

Example 9

A mixed solution of TEOS with an aqueous hydrochloric acid solution was stirred at 600 rpm for 5 minutes. While continuing the stirring, the mixed solution was then mixed with octylamine and the mixture was reacted at room temperature for 60 minutes (TEOS:HCl:octylamine:water= 1:0.391:0.674:43.403). After the reaction, the solid product was centrifuged and then dried at room temperature for 1 day and then at 50° C. for another 1 day. Finally, the product was heated at 500° C. for 2 hours to remove organic compounds and to obtain a mesoporous silica material. The porous material was in the form of hollow spherical particles and had pore characteristics, such as specific surface area, as shown in Table 9.

TABLE 9

| Amine | Interplanar Distance $d_{001}$ (nm) | BET Specific Surface Area $S_{BET}$ (m$^2$/g) | Pore Diameter d (nm) | Pore Volume V (ml/g) |
|---|---|---|---|---|
| Octylamine | 3.0 | 951 | 2.0 | 0.57 |

Example 10

A mixed solution of TEOS with an aqueous hydrochloric acid solution was stirred at 600 rpm for 5 minutes. While continuing the stirring, the mixed solution was then mixed with octylamine and the mixture was reacted at room temperature for 60 minutes (TEOS:HCl:octylamine:water= 1:0.446:0.674:49.603). After the reaction, the solid product was centrifuged and then dried at room temperature for 1 day and then at 50° C. for another 1 day. Finally, the product was heated at 500° C. for 2 hours to remove organic compounds and to obtain a mesoporous silica material. The porous material was in the form of hollow spherical particles and had pore characteristics, such as specific surface area, as shown in Table 10.

TABLE 10

| Amine | Interplanar Distance $d_{001}$ (nm) | BET Specific Surface Area $S_{BET}$ (m$^2$/g) | Pore Diameter d (nm) | Pore Volume V (ml/g) |
|---|---|---|---|---|
| Octylamine | 3.3 | 874 | 2.0 | 0.49 |

Example 11

A mixed solution of TEOS with an aqueous hydrochloric acid solution was stirred at 600 rpm for 5 minutes. While continuing the stirring, the mixed solution was then mixed with octylamine and the mixture was reacted at room temperature for 60 minutes (TEOS:HCl:octylamine:water= 1:0.056:0.674:6.200). After the reaction, the solid product was centrifuged and then dried at room temperature for 1 day and then at 50° C. for another 1 day. Finally, the product was heated at 500° C. for 2 hours to remove organic compounds and to obtain a mesoporous silica material. The porous material was in the form of hollow spherical particles and had pore characteristics, such as specific surface area, as shown n Table 11.

TABLE 11

| Amine | Interplanar Distance $d_{001}$ (nm) | BET Specific Surface Area $S_{BET}$ (m$^2$/g) | Pore Diameter d (nm) | Pore Volume V (ml/g) |
|---|---|---|---|---|
| Octylamine | 3.0 | 1,269 | 1.1 | 0.72 |

Example 12

A mixed solution of TEOS with an aqueous hydrochloric acid solution was stirred at 600 rpm for 5 minutes. While continuing the stirring, the mixed solution was then mixed with octylamine and the mixture was reacted at room temperature for 60 minutes (TEOS:HCl:octylamine:water= 1:0.558:0.674:62.004). After the reaction, the solid product was centrifuged and then dried at room temperature for 1 day and then at 50° C. for another 1 day. Finally, the product was heated at 500° C. for 2 hours to remove organic compounds and to obtain a mesoporous silica material. The porous material was in the form of hollow spherical particles and had pore characteristics, such as specific surface area, as shown in Table 12.

TABLE 12

| Amine | Interplanar Distance $d_{001}$ (nm) | BET Specific Surface Area $S_{BET}$ (m$^2$/g) | Pore Diameter d (nm) | Pore Volume V (ml/g) |
|---|---|---|---|---|
| Octylamine | 5.1 | 701 | 1.2 | 0.48 |

Example 13

A mixed solution of TEOS with an aqueous hydrochloric acid solution was stirred at 600 rpm for 5 minutes. While continuing the stirring, the mixed solution was then mixed with decylamine and the mixture was reacted at room temperature for 60 minutes (TEOS:HCl:decylamine:water= 1:0.045:0.563:24.802). After the reaction, the solid product was centrifuged and then dried at room temperature for 1 day and then at 50° C. for another 1 day. Finally, the product was heated at 500° C. for 2 hours to remove organic compounds and to obtain a mesoporous silica material. The porous material was in the form of plate-like particles each of which was an aggregate of flake-like crystallites and had pore characteristics, such as specific surface area, as shown in Table 13.

TABLE 13

| Amine | Interplanar Distance $d_{001}$ (nm) | BET Specific Surface Area $S_{BET}$ (m$^2$/g) | Pore Diameter d (nm) | Pore Volume V (ml/g) |
|---|---|---|---|---|
| Decylamine | — | 864 | nd | 0.75 |

Example 14

A mixed solution of TEOS with an aqueous hydrochloric acid solution was stirred at 600 rpm for 5 minutes. While continuing the stirring, the mixed solution was then mixed with decylamine and the mixture was reacted at room temperature for 60 minutes (TEOS:HCl:decylamine:water= 1:0.179:0.563:24.802). After the reaction, the solid product was centrifuged and then dried at room temperature for 1 day and then at 50° C. for another 1 day. Finally, the product was heated at 500° C. for 2 hours to remove organic compounds and to obtain a mesoporous silica material. The porous material was in the form of plate-like particles each of which was an aggregate of flake-like crystallites and had pore characteristics, such as specific surface area, as shown in Table 14.

TABLE 14

| Amine | Interplanar Distance $d_{001}$ (nm) | BET Specific Surface Area $S_{BET}$ (m$^2$/g) | Pore Diameter d (nm) | Pore Volume V (ml/g) |
|---|---|---|---|---|
| Decylamine | 3.8 | 766 | 3.1 | 0.61 |

Example 15

A mixed solution of TEOS with an aqueous hydrochloric acid solution was stirred at 600 rpm for 5 minutes. While continuing the stirring, the mixed solution was then mixed with decylamine and the mixture was reacted at room temperature for 60 minutes (TEOS:HCl:decylamine:water= 1:0.223:0.563:24.802). After the reaction, the solid product was centrifuged and then dried at room temperature for 1 day and then at 50° C. for another 1 day. Finally, the product was heated at 500° C. for 2 hours to remove organic compounds and to obtain a mesoporous silica material. The porous material was in the form of plate-like particles each of which was an aggregate of flake-like crystallites and had pore characteristics, such as specific surface area, as shown in Table 15.

TABLE 15

| Amine | Interplanar Distance $d_{001}$ (nm) | BET Specific Surface Area $S_{BET}$ (m$^2$/g) | Pore Diameter d (nm) | Pore Volume V (ml/g) |
|---|---|---|---|---|
| Decylamine | 3.9 | 779 | 3.0 | 0.67 |

Example 16

A mixed solution of TEOS with an aqueous hydrochloric acid solution was stirred at 600 rpm for 5 minutes. While continuing the stirring, the mixed solution was then mixed with decylamine and the mixture was reacted at room temperature for 60 minutes (TEOS:HCl:decylamine:water= 1:0.268:0.563:24.802). After the reaction, the solid product was centrifuged and then dried at room temperature for 1 day and then at 50° C. for another 1 day. Finally, the product was heated at 500° C. for 2 hours to remove organic compounds and to obtain a mesoporous silica material. The porous material was in the form of plate-like particles each of which was an aggregate of flake-like crystallites and had pore characteristics, such as specific surface area, as shown in Table 16.

TABLE 16

| Amine | Interplanar Distance $d_{001}$ (nm) | BET Specific Surface Area $S_{BET}$ (m$^2$/g) | Pore Diameter d (nm) | Pore Volume V (ml/g) |
|---|---|---|---|---|
| Decylamine | 3.7 | 755 | 2.9 | 0.63 |

Example 17

A mixed solution of TEOS with an aqueous hydrochloric acid solution was stirred at 600 rpm for 5 minutes. While continuing the stirring, the mixed solution was then mixed with decylamine and the mixture was reacted at room temperature for 60 minutes (TEOS:HCl:decylamine:water= 1:0.446:0.563:24.802). After the reaction, the solid product was centrifuged and then dried at room temperature for 1 day and then at 50° C. for another 1 day. Finally, the product was heated at 500° C. for 2 hours to remove organic compounds and to obtain a mesoporous silica material. The porous material was in the form of plate-like particles each of which was an aggregate of flake-like crystallites and had pore characteristics, such as specific surface area, as shown in Table 17.

TABLE 17

| Amine | Interplanar Distance $d_{001}$ (nm) | BET Specific Surface Area $S_{BET}$ (m²/g) | Pore Diameter d (nm) | Pore Volume V (ml/g) |
|---|---|---|---|---|
| Decylamine | 3.8 | 552 | 1.0 | 0.29 |

Example 18

A mixed solution of TEOS with an aqueous hydrochloric acid solution was stirred at 600 rpm for 5 minutes. While continuing the stirring, the mixed solution was then mixed with decylamine and the mixture was reacted at room temperature for 60 minutes (TEOS:HCl:decylamine:water= 1:0.446:0.563:49.603). After the reaction, the solid product was centrifuged and then dried at room temperature for 1 day and then at 50° C. for another 1 day. Finally, the product was heated at 500° C. for 2 hours to remove organic compounds and to obtain a mesoporous silica material. The porous material was in the form of plate-like particles each of which was an aggregate of flake-like crystallites and had pore characteristics, such as specific surface area, as shown in Table 18.

TABLE 18

| Amine | Interplanar Distance $d_{001}$ (nm) | BET Specific Surface Area $S_{BET}$ (m²/g) | Pore Diameter d (nm) | Pore Volume V (ml/g) |
|---|---|---|---|---|
| Decylamine | 3.8 | 513 | 1.0 | 0.24 |

Example 19

A mixed solution of TEOS with an aqueous hydrochloric acid solution was stirred at 600 rpm for 5 minutes. While continuing the stirring, the mixed solution was then mixed with dodecylamine and the mixture was reacted at room temperature for 60 minutes (TEOS:HCl:dodecylamine:water=1:0.045:0.484:24.802). After the reaction, the solid product was centrifuged and then dried at room temperature for 1 day and then at 50° C. for another 1 day. Finally, the product was heated at 500° C. for 2 hours to remove organic compounds and to obtain a mesoporous silica material. The porous material was in the form of plate-like particles each of which was an aggregate of flake-like crystallites and had pore characteristics, such as specific surface area, as shown in Table 19.

TABLE 19

| Amine | Interplanar Distance $d_{001}$ (nm) | BET Specific Surface Area $S_{BET}$ (m²/g) | Pore Diameter d (nm) | Pore Volume V (ml/g) |
|---|---|---|---|---|
| Dodecylamine | 4.9 | 792 | nd | 0.80 |

Example 20

A mixed solution of TEOS with an aqueous hydrochloric acid solution was stirred at 600 rpm for 5 minutes. While continuing the stirring, the mixed solution was then mixed with dodecylamine and the mixture was reacted at room temperature for 60 minutes (TEOS:HCl:dodecylamine:water=1:0.179:0.484:24.802). After the reaction, the solid product was centrifuged and then dried at room temperature for 1 day and then at 50° C. for another 1 day. Finally, the product was heated at 500° C. for 2 hours to remove organic compounds and to obtain a mesoporous silica material. The porous material was in the form of plate-like particles each of which was an aggregate of flake-like crystallites and had pore characteristics, such as specific surface area, as shown in Table 20.

TABLE 20

| Amine | Interplanar Distance $d_{001}$ (nm) | BET Specific Surface Area $S_{BET}$ (m²/g) | Pore Diameter d (nm) | Pore Volume V (ml/g) |
|---|---|---|---|---|
| Dodecylamine | 4.6 | 651 | 4.0 | 0.45 |

Example 21

A mixed solution of TEOS with an aqueous hydrochloric acid solution was stirred at 600 rpm for 5 minutes. While continuing the stirring, the mixed solution was then mixed with dodecylamine and the mixture was reacted at room temperature for 60 minutes (TEOS:HCl:dodecylamine:water=1:0.223:0.484:24.802). After the reaction, the solid product was centrifuged and then dried at room temperature for 1 day and then at 50° C. for another 1 day. Finally, the product was heated at 500° C. for 2 hours to remove organic compounds and to obtain a mesoporous silica material. The porous material was in the form of plate-like particles each of which was an aggregate of flake-like crystallites and had pore characteristics, such as specific surface area, as shown in Table 21.

TABLE 21

| Amine | Interplanar Distance $d_{001}$ (nm) | BET Specific Surface Area $S_{BET}$ (m²/g) | Pore Diameter d (nm) | Pore Volume V (ml/g) |
|---|---|---|---|---|
| Dodecylamine | 3.9 | 826 | 3.8 | 0.61 |

Example 22

A mixed solution of TEOS with an aqueous hydrochloric acid solution was stirred at 600 rpm for 5 minutes. While continuing the stirring, the mixed solution was then mixed with dodecylamine and the mixture was reacted at room temperature for 60 minutes (TEOS:HCl:dodecylamine:water=1:0.268:0.484:24.802). After the reaction, the solid product was centrifuged and then dried at room temperature for 1 day and then at 50° C. for another 1 day. Finally, the product was heated at 500° C. for 2 hours to remove organic compounds and to obtain a mesoporous silica material. The porous material was in the form of plate-like particles each of which was an aggregate of flake-like crystallites and had pore characteristics, such as specific surface area, as shown in Table 22.

TABLE 22

| Amine | Interplanar Distance $d_{001}$ (nm) | BET Specific Surface Area $S_{BET}$ (m²/g) | Pore Diameter d (nm) | Pore Volume V (ml/g) |
|---|---|---|---|---|
| Dodecylamine | 4.9 | 602 | 3.6 | 0.42 |

Example 23

The dried product obtained in Example 1 was heated at 800° C. for 1 hour to remove organic compounds and to obtain a mesoporous silica material. The porous product had pore characteristics, such as specific surface area, as shown in Table 23.

TABLE 23

| Amine | Interplanar Distance $d_{001}$ (nm) | BET Specific Surface Area $S_{BET}$ (m²/g) | Pore Diameter d (nm) | Pore Volume V (ml/g) |
|---|---|---|---|---|
| Hexylamine | 3.0 | 771 | 0.9 | 0.26 |

Example 24

The dried product obtained in Example 6 was heated at 800° C. for 1 hour to remove organic compounds and to obtain a mesoporous silica material. The porous product had pore characteristics, such as specific surface area, as shown in Table 24.

TABLE 24

| Amine | Interplanar Distance $d_{001}$ (nm) | BET Specific Surface Area $S_{BET}$ (m²/g) | Pore Diameter d (nm) | Pore Volume V (ml/g) |
|---|---|---|---|---|
| Octylamine | 3.5 | 707 | 1.8 | 0.37 |

Example 25

The dried product obtained in Example 8 was heated at 800° C. for 1 hour to remove organic compounds and to obtain a mesoporous silica material. The porous product had pore characteristics, such as specific surface area, as shown in Table 25.

TABLE 25

| Amine | Interplanar Distance $d_{001}$ (nm) | BET Specific Surface Area $S_{BET}$ (m²/g) | Pore Diameter d (nm) | Pore Volume V (ml/g) |
|---|---|---|---|---|
| Octylamine | 3.1 | 562 | 1.5 | 0.27 |

Example 26

The dried product obtained in Example 10 was heated at 800° C. for 1 hour to remove organic compounds and to obtain a mesoporous silica material. The porous product had pore characteristics, such as specific surface area, as shown in Table 26.

TABLE 26

| Amine | Interplanar Distance $d_{001}$ (nm) | BET Specific Surface Area $S_{BET}$ (m²/g) | Pore Diameter d (nm) | Pore Volume V (ml/g) |
|---|---|---|---|---|
| Dodecylamine | 3.3 | 674 | 1.8 | 0.32 |

Example 27

The dried product obtained in Example 15 was heated at 800° C. for 1 hour to remove organic compounds and to obtain a mesoporous silica material. The porous product had pore characteristics, such as specific surface area, as shown in Table 27.

TABLE 27

| Amine | Interplanar Distance $d_{001}$ (nm) | BET Specific Surface Area $S_{BET}$ (m²/g) | Pore Diameter d (nm) | Pore Volume V (ml/g) |
|---|---|---|---|---|
| Decylamine | 3.9 | 707 | 2.7 | 0.64 |

Example 28

The dried product obtained in Example 21 was heated at 800° C. for 1 hour to remove organic compounds and to obtain a mesoporous silica material. The porous product had pore characteristics, such as specific surface area, as shown in Table 28.

TABLE 28

| Amine | Interplanar Distance $d_{001}$ (nm) | BET Specific Surface Area $S_{BET}$ (m²/g) | Pore Diameter d (nm) | Pore Volume V (ml/g) |
|---|---|---|---|---|
| Dodecylamine | 3.9 | 597 | 3.1 | 0.33 |

Example 29

A mixed solution of TEOS with an aqueous nitric acid solution was stirred at 600 rpm for 5 minutes. While continuing the stirring, the mixed solution was then mixed with octylamine and the mixture was reacted at room temperature for 60 minutes (TEOS:HNO₃:octylamine:water=1:0.447:0.674:24.802). After the reaction, the solid product was centrifuged and then dried at room temperature for 1 day and then at 50° C. for another 1 day. Finally, the product was heated at 500° C. for 2 hours to remove organic compounds and to obtain a mesoporous silica material. The porous material was in the form of spherical particles and had pore characteristics, such as specific surface area, as shown in Table 29.

TABLE 29

| Amine | Interplanar Distance $d_{001}$ (nm) | BET Specific Surface Area $S_{BET}$ (m²/g) | Pore Diameter d (nm) | Pore Volume V (ml/g) |
|---|---|---|---|---|
| Octylamine | 3.5 | 831 | 2.0 | 0.50 |

Example 30

A mixed solution of TEOS with an aqueous sulfuric acid solution was stirred at 600 rpm for 5 minutes. While continuing the stirring, the mixed solution was then mixed with octylamine and the mixture was reacted at room temperature for 60 minutes (TEOS:$H_2SO_4$:octylamine:water=1:0.2235:0.674:24.8029). After the reaction, the solid product was centrifuged and then dried at room temperature for 1 day and then at 50° C. for another 1 day. Finally, the product was heated at 500° C. for 2 hours to remove organic compounds and to obtain a mesoporous silica material. The porous material was partly in the form of spherical particles and had pore characteristics, such as specific surface area, as shown in Table 30.

TABLE 30

| Amine | Interplanar Distance $d_{001}$ (nm) | BET Specific Surface Area $S_{BET}$ (m²/g) | Pore Diameter d (nm) | Pore Volume V (ml/g) |
| --- | --- | --- | --- | --- |
| Octylamine | 3.5 | 8271 | 1.8 | 0.47 |

Example 31

A mixed solution (15 ml) of TEOS:octylamine=1:0.674 was stirred at 400 rpm for 5 minutes. While continuing the stirring, the mixed solution was then mixed with 60 ml of 0.125M hydrochloric acid solution and the mixture was reacted for 1 hour (TEOS:HCl:octylamine:water= 1:0.1674:0.674:74.4). After the reaction, the solid product was centrifuged and then dried at 50° C. for 2 days. Finally, the product was heated at 600° C. for 1 hour to remove organic compounds and to obtain mesoporous silica hard spheres. The porous product had pore characteristics, such as specific surface area, as shown in Table 31.

TABLE 31

| Amine | Interplanar Distance $d_{001}$ (nm) | BET Specific Surface Area $S_{BET}$ (m²/g) | Pore Diameter d (nm) | Pore Volume V (ml/g) |
| --- | --- | --- | --- | --- |
| Octylamine | 3.7 | 955 | 2.0 | 0.78 |

Example 32

A mixed solution (20 ml) of TEOS:octylamine=1:0.449 was stirred at 400 rpm for 5 minutes. While continuing the stirring, the mixed solution was then mixed with 60 ml of 0.125M hydrochloric acid solution and the mixture was reacted for 1 hour (TEOS:HCl:octylamine:water= 1:0.112:0.449:49.6). After the reaction, the solid product was centrifuged and then dried at 50° C. for 2 days. Finally, the product was heated at 600° C. for 1 hour to remove organic compounds and to obtain mesoporous silica hard spheres. The porous product had pore characteristics, such as specific surface area, as shown in Table 32.

TABLE 32

| Amine | Interplanar Distance $d_{001}$ (nm) | BET Specific Surface Area $S_{BET}$ (m²/g) | Pore Diameter d (nm) | Pore Volume V (ml/g) |
| --- | --- | --- | --- | --- |
| Octylamine | 3.7 | 880 | 2.3 | 0.57 |

Example 33

A mixed solution (20 ml) of TEOS:TEOT (tetraethyl orthotitanate):octylamine 1:0.0268:0.462 was stirred at 400 rpm for 5 minutes. While continuing the stirring, the mixed solution was then mixed with 60 ml of 0.125M hydrochloric acid solution and the mixture was reacted for 1 hour (TEOS:TEOT:HCl:octylamine:water= 1:0.0268:0.115:0.462:50.97). After the reaction, the solid product was centrifuged and then dried at 50° C. for 2 days. Finally, the product was heated at 600° C. for 1 hour to remove organic compounds and to obtain Ti-containing, mesoporous silica hard spheres. The porous product had pore characteristics, such as specific surface area, as shown in Table 33.

TABLE 33

| Amine | Interplanar Distance $d_{001}$ (nm) | BET Specific Surface Area $S_{BET}$ (m²/g) | Pore Diameter d (nm) | Pore Volume V (ml/g) |
| --- | --- | --- | --- | --- |
| Octylamine | 3.6 | 923 | 2.2 | 0.55 |

Example 34

A mixed solution (20 ml) of TEOS:TBOZ (zirconium tetra-n-butoxide dissolved in butanol in an amount of 80 wt %):octylamine=1:0.0238:0.460 was stirred at 400 rpm for 5 minutes. While continuing the stirring, the mixed solution was then mixed with 60 ml of 0.125M hydrochloric acid solution and the mixture was reacted for 1 hour (TEOS:TBOZ:HCl:octylamine:water= 1:0.0238:0.114:0.460:50.97). After the reaction, the solid product was centrifuged and then dried at 50° C. for 2 days. Finally, the product was heated at 600° C. for 1 hour to remove organic compounds and to obtain Zr-containing, mesoporous silica hard spheres. The porous product had pore characteristics, such as specific surface area, as shown in Table 34.

TABLE 34

| Amine | Interplanar Distance $d_{001}$ (nm) | BET Specific Surface Area $S_{BET}$ (m²/g) | Pore Diameter d (nm) | Pore Volume V (ml/g) |
| --- | --- | --- | --- | --- |
| Octylamine | 3.7 | 909 | 2.2 | 0.43 |

Example 35

A mixed solution (20 ml) of TEOS:aluminum tri-sec-butoxide:octylamine=1:0.284:0.459 was stirred at 400 rpm for 5 minutes. While continuing the stirring, the mixed solution was then mixed with 60 ml of 0.125M hydrochloric acid solution and the mixture was reacted for 1 hour (TEOS:aluminum tri-sec-butoxide:HCl:octylamine:water= 1:0.0284:0.114:0.459:50.6). After the reaction, the solid product was centrifuged and then dried at 50° C. for 2 days. Finally, the product was heated at 600° C. for 1 hour to remove organic compounds and to obtain Al-containing, mesoporous silica hard spheres. The porous product had pore characteristics, such as specific surface area, as shown in Table 35.

TABLE 35

| Amine | Interplanar Distance $d_{001}$ (nm) | BET Specific Surface Area $S_{BET}$ (m²/g) | Pore Diameter d (nm) | Pore Volume V (ml/g) |
|---|---|---|---|---|
| Octylamine | 3.5 | 859 | 2.1 | 0.41 |

Example 36

To about 15 ml of TEOS, 5 ml of a Cu-amine complex solution was added to provide TEOS:Cu$^{2+}$:octylamine=1:0.0011:0.4597. The mixture was stirred at 400 rpm for 5 minutes. While continuing the stirring, the mixture was added with 60 ml of 0.125M hydrochloric acid solution and was reacted for 1 hour (TEOS:Cu2+:HCl:octylamine:water=1:0.0011:0.1142:0.4597:50.60). The copper compound used as the starting material was cupric chloride (dihydride). After the reaction, the solid product was centrifuged and then dried at 50° C. for 2 days. Finally, the product was heated at 600° C. for 1 hour to remove organic compounds and to obtain Cu-containing, mesoporous silica hard spheres. The porous product had pore characteristics, such as specific surface area, as shown in Table 36.

TABLE 36

| Amine | Interplanar Distance $d_{001}$ (nm) | BET Specific Surface Area $S_{BET}$ (m²/g) | Pore Diameter d (nm) | Pore Volume V (ml/g) |
|---|---|---|---|---|
| Octylamine | 3.7 | 957 | 2.0 | 0.78 |

Example 37

To about 15 ml of a mixed solution of TEOS and TEOT, 5 ml of a Cu-amine complex solution was added to provide TEOS:TEOT:Cu$^{2+}$:octylamine=1:0.0262:0.0010:0.4588. The mixture was stirred at 400 rpm for 5 minutes. While continuing the stirring, the mixture was added with 60 ml of 0.125M hydrochloric acid solution and was reacted for 1 hour (TEOS:TEOT:Cu$^{2+}$:HCl:octylamine:water=1:0.0260:0.0016:0.1139:0.4588:50.64). The copper compound used as the starting material was cupric chloride (dihydride). After the reaction, the solid product was centrifuged and then dried at 50° C. for 2 days. Finally, the product was heated at 600° C. for 1 hour to remove organic compounds and to obtain Ti- and Cu-containing, mesoporous silica hard spheres. The porous product had pore characteristics, such as specific surface area, as shown in Table 37.

TABLE 37

| Amine | Interplanar Distance $d_{001}$ (nm) | BET Specific Surface Area $S_{BET}$ (m²/g) | Pore Diameter d (nm) | Pore Volume V (ml/g) |
|---|---|---|---|---|
| Octylamine | 3.7 | 962 | 2.0 | 0.68 |

Example 38

The dried product obtained in Example 32 was heated at 800° C. for 1 hour to obtain a porous product having pore characteristics, such as specific surface area, as shown in Table 38.

TABLE 38

| Amine | Interplanar Distance $d_{001}$ (nm) | BET Specific Surface Area $S_{BET}$ (m²/g) | Pore Diameter d (nm) | Pore Volume V (ml/g) |
|---|---|---|---|---|
| Octylamine | 3.6 | 811 | 2.0 | 0.47 |

Example 39

The dried product obtained in Example 33 was heated at 800° C. for 1 hour to obtain a porous product having pore characteristics, such as specific surface area, as shown in Table 39.

TABLE 39

| Amine | Interplanar Distance $d_{001}$ (nm) | BET Specific Surface Area $S_{BET}$ (m²/g) | Pore Diameter d (nm) | Pore Volume V (ml/g) |
|---|---|---|---|---|
| Octylamine | 3.5 | 851 | 1.9 | 0.52 |

What is claimed is:

1. A method of producing a mesoporous silica material, comprising reacting, with stirring, a liquid mixture containing a tetraalkyl orthosilicate, a linear alkylamine, an inorganic acid and water, and drying and thermally treating the thus obtained solid product, wherein said inorganic acid, said alkylamine and said water are present in amounts of 0.05–0.6 mol, 0.2–1.0 mol and 10–100 mol, respectively, per mol of said tetraalkyl orthosilicate.

2. A method according to claim 1, further comprising the step of mixing said tetraalkyl orthosilicate, inorganic acid and water to form an emulsion, wherein said reacting includes mixing said emulsion with said linear alkylamine, thereby obtaining a hollow or plate-like mesoporous silica material.

3. A method according to claim 2, wherein said linear alkylamine has 8–12 carbon atoms.

4. A method according to claim 2, wherein said emulsion forming step is performed for 1–10 minutes and said reaction step is performed for 15–120 minutes.

5. A method according to claim 1 further comprising the step of mixing said tetraalkyl orthosilicate with said alkylamine to form a mixture, wherein said reacting includes further mixing said mixture with an aqueous solution of said inorganic acid.

6. A method according to claim 5, wherein said linear alkylamine has 8–12 carbon atoms.

7. A method according to claim 5, wherein said mixing step is performed for 1–10 minutes and said reaction step is performed for 15–120 minutes.

8. A method according to claim 5, wherein said mixing step additionally includes adding at least one metal (other than silicon) component in an amount of 0.001–0.1 mol per mole of said tetraalkyl orthsilicate.

9. A method according to claim 8, wherein said linear alkylamine has 8–12 carbon atoms.

10. A method according to claim 8, wherein said mixing step is performed for 1–20 minutes and said reaction step is performed for 15–120 minutes.

11. A method according to claim 8, wherein said metal is at least one member selected from the group consisting of Ti, Zr, Al, Cu, Co and Ni.

12. Mesoporous silica hard spheres having an average pore diameter of 1.5–4 nm, periodically distributed pores giving (001) reflection in a x-ray diffraction pattern thereof, and a volume average diameter of 40–80 μm.

13. Mesoporous silica hard spheres according to claim 12 and having a specific surface area of at least 800 m$^2$/g when heated at 600° C. for 1 hour in air.

14. Mesoporous silica hard spheres according to claim 12 and containing a metal other than silicon.

15. Mesoporous silica hard spheres according to claim 14, wherein said metal is substituted for silicon in a silicate framework thereof.

16. Mesoporous silica hard spheres according to claim 14, wherein said metal is dispersed therein as an oxide.

17. Mesoporous silica hard spheres according to claim 14, wherein said metal is at least one member selected from the group consisting of Ti, Zr, Al, Cu, Co and Ni.

18. Mesoporous silica hard spheres according to claim 14 and having a specific surface area of at least 800 m 2/g when heated at 600° C. for 1 hour in air.

19. Mesoporous silica hard spheres according to claims 12 wherein said pores form a hexagonal matrix wall structure.

\* \* \* \* \*

UNITED STATES PATENT AND TRADEMARK OFFICE
CERTIFICATE OF CORRECTION

PATENT NO. : 6,174,512 B1
DATED : January 16, 2001
INVENTOR(S) : Kosuge et al.

It is certified that error appears in the above-identified patent and that said Letters Patent is hereby corrected as shown below:

Column 4,
Lines 36 and 37, "orthsilicate" should read -- orthosilicate --, both instances; and
Line 38, "orthsilicate" should read -- orthosilicate --.

Column 10,
Line 49, "n" should read -- in --.

Column 11,
Lines 24 and 48, "500 C" should read -- 50 C --.

Column 20,
Line 59, "orthsilicate" should read -- orthosilicate --.

Signed and Sealed this

Ninth Day of April, 2002

Attest:

Attesting Officer

JAMES E. ROGAN
*Director of the United States Patent and Trademark Office*